US006604827B2

(12) United States Patent
Janssen

(10) Patent No.: US 6,604,827 B2
(45) Date of Patent: Aug. 12, 2003

(54) EFFICIENT ARC LAMP ILLUMINATOR FOR PROJECTION SYSTEM

(75) Inventor: Peter J Janssen, Scarborough, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/948,332

(22) Filed: Sep. 7, 2001

(65) Prior Publication Data

US 2003/0048420 A1 Mar. 13, 2003

(51) Int. Cl.[7] .................. G03B 21/00; G03B 21/14; G03B 21/26
(52) U.S. Cl. .............. 353/31; 353/20; 353/34
(58) Field of Search ................. 353/31, 7, 8, 20, 353/33, 34, 49, 81, 85, 87, 84

(56) References Cited

U.S. PATENT DOCUMENTS

| 5,098,184 A | * | 3/1992 | van den Brandt et al. .. 353/102 |
| 5,410,370 A | | 4/1995 | Janssen ...................... 348/756 |
| 5,416,514 A | | 5/1995 | Janssen et al. .............. 348/196 |
| 5,986,809 A | * | 11/1999 | Itoh et al. ................... 359/495 |
| 6,111,618 A | * | 8/2000 | Booth et al. .................. 349/5 |
| 6,406,149 B2 | * | 6/2002 | Okuyama .................... 353/38 |

* cited by examiner

Primary Examiner—Russell Adams
Assistant Examiner—Andrew Sever

(57) ABSTRACT

An arc lamp illuminator for a projection system includes one or more polarization conversion prisms to laterally spread the arc image. A pair or triplet of projection lenses can be used with mirrors and field lenses to direct the arc image along separate paths to separate polarization conversion prisms to further laterally spread the original arc image. A compact arrangement of the two-path embodiment is enabled by the use of a compound light guide including a pair of arc image-sized input ports, a pair of TIR prisms for directing the arc image along a common path, and a rectangular light guide for guiding the arc images to the polarization conversion system.

8 Claims, 9 Drawing Sheets

EFFICIENT ARC LAMP ILLUMINATOR FOR PROJECTION SYSTEM

CROSS REFERENCE TO RELATED APPLICATION

U.S. patent application Ser. No. 10/024,775, filed Dec. 19, 2001, and assigned to the same Assignee as the present application, relates to an improvement of a polarization conversion prism, which may be used in the invention of the present application.

BACKGROUND OF THE INVENTION

This invention relates to illuminators for projection display systems, and more particularly relates to an arc lamp illuminator particularly suitable for use in a single panel scrolling color projection display system.

A single panel scrolling color projection display system is characterized by a single light modulator panel such as a liquid crystal display (LCD) panel having a raster of individual picture elements or pixels, which panel is illuminated by horizontally elongated red, green and blue illumination bars or stripes. The stripes are continuously scrolled vertically across the panel while synchronously addressing the rows of pixels with display information corresponding to the color of the then incident stripe. See, for example, U.S. Pat. No. 5,410,370, "Single panel color projection video display improved scanning" issued to P. Janssen on Mar. 25, 1994, and U.S. Pat. No. 5,416,514, "Single panel color projection video display having control circuitry for synchronizing the color illumination system with reading/writing of the light valve" issued to P. Janssen et al. on May 16, 1995.

Illuminators, commonly used in three panel liquid crystal display (LCD) projectors, utilize high intensity arc lamps to provide the level of intensity needed for projection systems. Such illuminators utilize lenticular arrays to homogenize the light from the arc lamp on the light valve, hence also on the screen. U.S. Pat. No. 5,986,809, describes an illuminator in which the uniformity of illumination is improved by separating a source beam into a plurality of intermediate beams that converge at a converging position, condensing the intermediate beams, spatially separating each of the intermediate beams into an S polarized beam and a P polarized beam, and then superimposing the polarized beams.

Although such illuminators indeed achieve a uniform illumination, angular space is not utilized in the best possible way. For a scrolling color system, which has a low angular extent, this leads to a lower brightness than is theoretically possible.

SUMMARY OF THE INVENTION

An arc lamp illuminator for a projection system includes one or more polarization conversion systems to laterally spread the arc image, creating one or more primary and secondary arc images. For a single panel scrolling color projection system, the primary and secondary images are spaced to allow for interleaving, to form an elongated arc image approximating the geometry of the scrolling stripe.

In its broadest aspects, the arc lamp illuminator comprises:

an arc lamp comprising an envelope enclosing an elongated arc having an axis lying in a lateral plane;

at least one projection lens for projecting an image of the arc;

at least one polarization conversion system oriented to split the projected arc image into primary and secondary arc images along the arc axis in the lateral plane; and a rotator device for converting the polarization sense of either the primary or secondary arc image to correspond to the polarization sense of the other arc image.

In one embodiment, the arc lamp illuminator has a pair of projection lenses for projecting the arc image along first and second paths. For each path, the illuminator includes a polarization conversion system, a field lens for directing the projected arc image into the polarization conversion system, and a plane mirror for directing the projected arc image to the field lens.

The projection lenses may project the arc images along paths either in the lateral plane, in which case the plane mirrors are normal to the lateral plane to reflect the projected images to the field lenses.

Alternatively, the projection lenses project the arc images along paths above and below the lateral plane, and the plane mirrors are parallel to and lie above and below the lateral plane, respectively, to reflect the projected images to the field lenses.

In another embodiment, the arc lamp illuminator has three projection lenses for projecting the arc image along three different paths, a central path and two outer paths. For each path, the illuminator includes a polarization conversion system and a small mirror for directing the projected arc image into the polarization conversion system. For the two outer paths, a large mirror is provided for directing the projected arc image to the small mirror.

The polarization conversion system is typically embodied as a polarization conversion prism, while the rotator device is typically a quarter wave plate.

Compared to the prior art, this illuminator enables the use of longer arc lamps, and provides uniformity of illumination while maximizing brightness for a system having a low angular extent, such as a single panel scrolling color system.

The invention also includes a projection system including a light modulator panel for modulating a light image in accordance with an electrical signal; a lens for projecting the modulated image onto a display screen; and the arc lamp illuminator for illuminating the light modulator panel.

DETAILED DESCRIPTION OF THE INVENTION

Figure 1A:
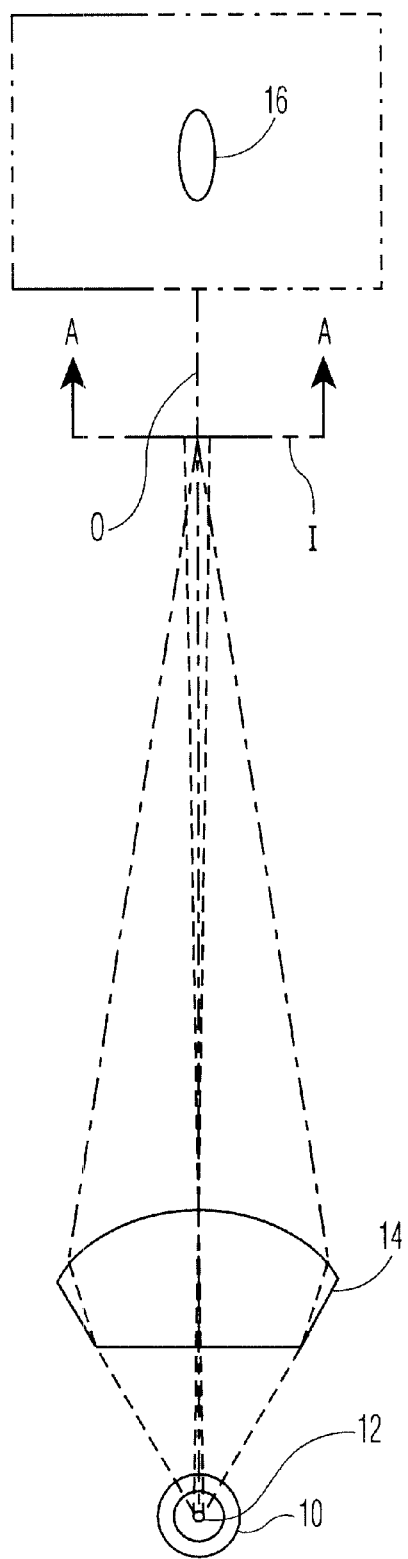
FIGS. 1A and 1B are axial and lateral views, respectively, of an arc lamp illuminator of the prior art for a projection system, showing projected views of the arc image.
Figure 1B:
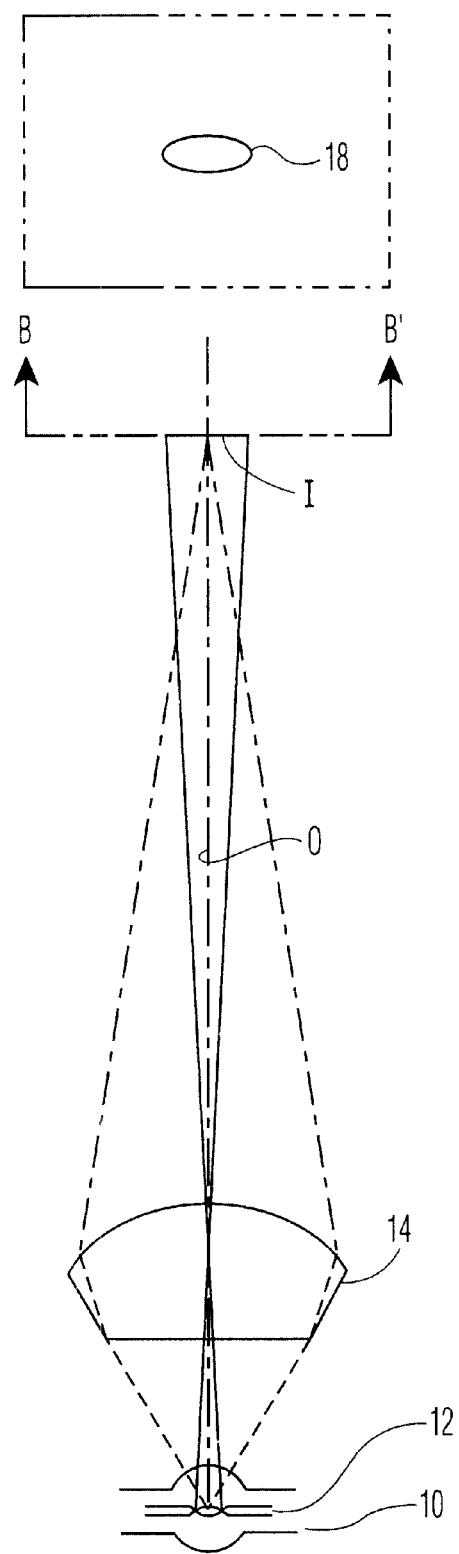

Referring now to FIGS. 1A and 1B, axial and lateral views, respectively, of an arc lamp illuminator of the prior art for a projection system, the image of an elongated arc 12 of arc lamp 10 is projected to an image plane I by a condenser lens 14. The orientation of the arc 12 is defined by axial and lateral planes, respectively, each of which planes pass through the optic axis O of condenser lens 14. The arc lamp is positioned so that arc 12 is transverse to the axial plane and lies in the lateral plane. In the axial view of FIG. 1A, the arc image 16, seen along section A–A', appears on image plane oriented vertically, which in the lateral view of FIG. 1B, the arc image 18, seen along section B–B', is oriented horizontally. In accordance with the invention, an image approximating the shape of an illumination stripe can be built from the arc image 18 using polarization conversion optics.

Figure 1C:
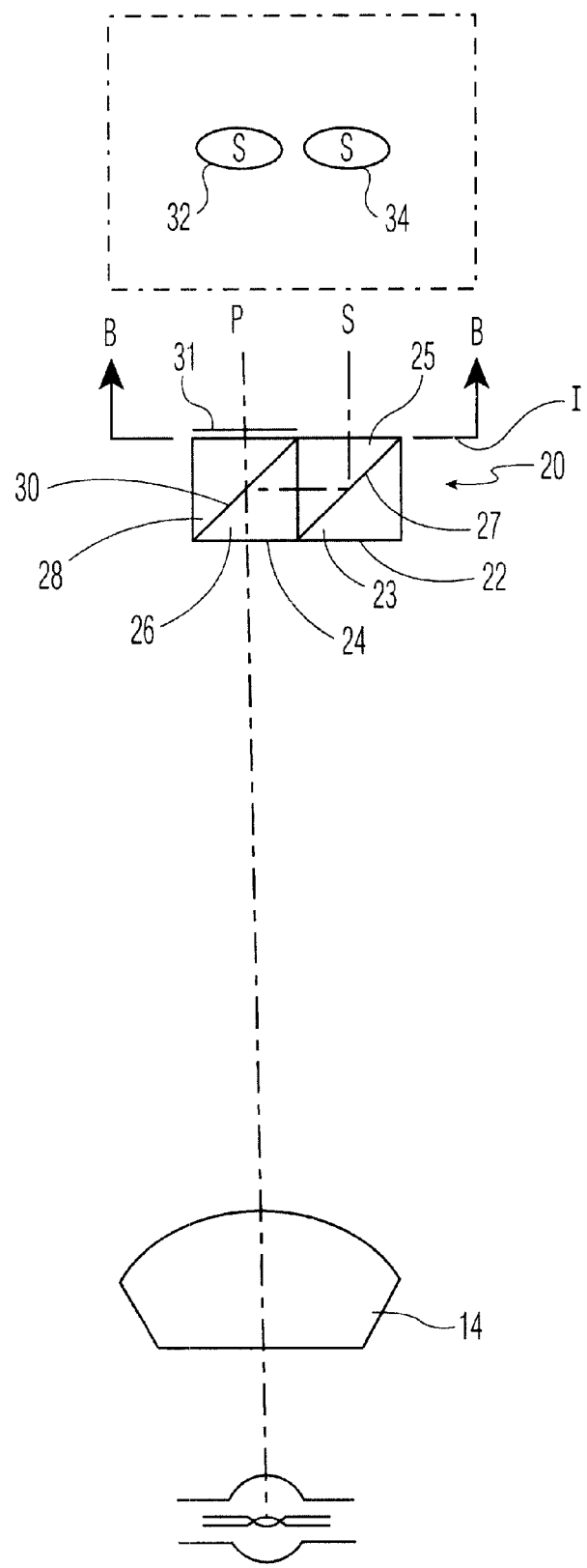
FIG. 1C is a lateral view of an arc lamp illuminator of the invention, showing a projected view of primary and secondary arc images.

FIG. 1C, also a lateral view, shows the effect on the arc image of inserting a polarization conversion device 20 into the optic path at the image plane I. The arc image 18 is effectively split into primary (P) and secondary (S) arc images 32 and 34 by PCD 20. PCD 20 is of a known type, composed of two compound prisms 22 and 24, each including an internal directional polarizer (27, 30) bounded by a pair of prisms (23, 25) and (26, 28), respectively. In operation, unpolarized light from the condenser lens 14 enters prism 26. A portion of the light is converted to P polarized light by polarizer 30. This P light passes through prism 28 to form primary arc image 32, while the remainder of the light is converted to S polarized light by polarizer 30, is reflected by polarizers 30 and 27, respectively, and passes through prism 25 to form secondary arc image 34. Half wave plate 31 inserted into the path of the primary image converts it's light from P to S.

PCD 20 is oriented so that planar polarizers 27 and 30 are normal to the lateral plane, whereby the elongated arc image is split laterally along its longitudinal axis, to result in an elongated illumination beam which is elongated along the arc axis for a distance greater than the length of the original arc image. The polarizers 27 and 30 in FIG. 1C are spaced to completely separate the primary and secondary arc images. Alternatively, the primary and secondary arc images may be partially overlapping, in order to enhance the uniformity of illumination of the resulting illumination beam. This can be accomplished either by spacing the polarizers 27 and 30 closer together or by the use of one or more auxiliary lens elements to partially converge rays of the primary and secondary arc images; naturally, the result would be that the input image no longer fits in the aperture formed by the prism boundaries and some light will be lost.

Figure 2:
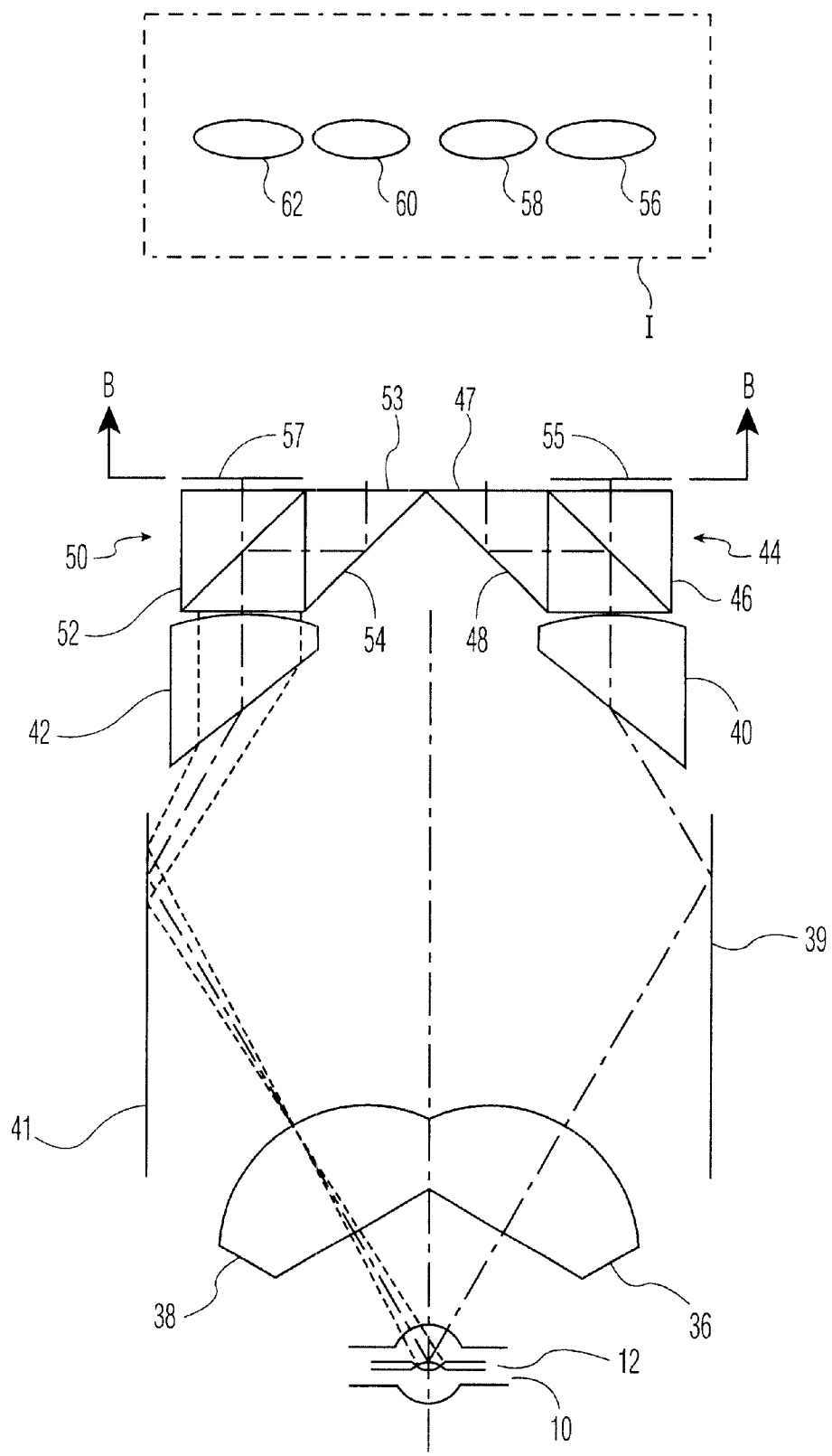
FIG. 2 is a lateral view of a two-lens arc lamp illuminator of the invention, showing a projected view of two primary and two secondary arc images.

FIG. 2, a lateral view of a two-lens arc lamp illuminator of the invention, illustrates a further extension of the principle of the invention of building a stripe from arc images. Condenser lenses 36 and 38 split the arc image path into two paths directed laterally away from central axis C. This arrangement enables the use of a pair of PCD's 44 and 50 to form a total of four arc images (56, 58, 60, 62) at the image plane. Due to the relatively large size and close proximity of the condenser lenses 36 and 38 to the image plane in this embodiment, plane mirrors 39 and 41 are employed to reflect the diverging image paths back toward central axis C to field lenses 40 and 42, respectively, and thence to PCD's 44 and 50.

PCD's 44 and 50 are different from POD 20 shown in FIG. 1C. Instead of two compound prisms, the PCD's 44 and 50 are composed of a compound prism (46, 52) and another prism (47, 53) with a totally internal reflecting (TIE) surface (48, 54). Light from the compound prisms 46 and 52 is laterally confined by the TIR surfaces 48 and 54, homogenizing the light output at the image plane I. Half wave plates 55 and 57 rotate the exiting P components 90 degrees, converting them to S components, as in the case of half wave plate 31 in FIG. 10. One exemplary embodiment of such a PCD suitable for use in the present invention is described in U.S. Pat. No. 5,986,809.

Depending upon the particular application envisioned for the illuminator, other optic designs are possible, in which the condenser lenses aim the image paths directly to the field lenses, or even directly to the PCD's, rendering the mirrors and/or field lenses unnecessary. Such designs are of course permissible variations within the broad scope of the invention.

Figure 3A:
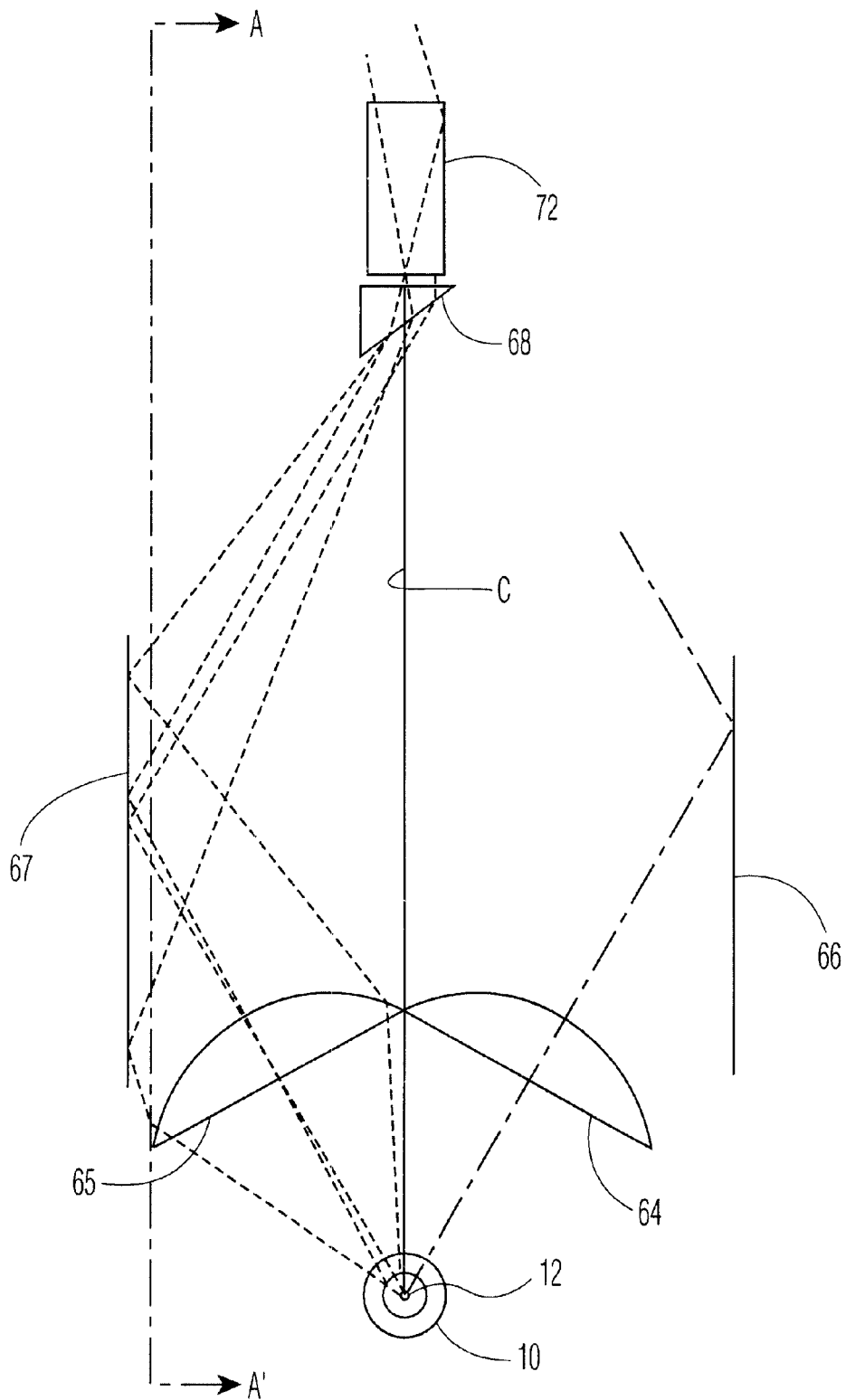
FIGS. 3A and 3B are axial and lateral views, respectively, of another two-lens arc lamp illuminator of the invention, with FIG. 3B showing projected views of the light distribution in different planes.
Figure 3B:
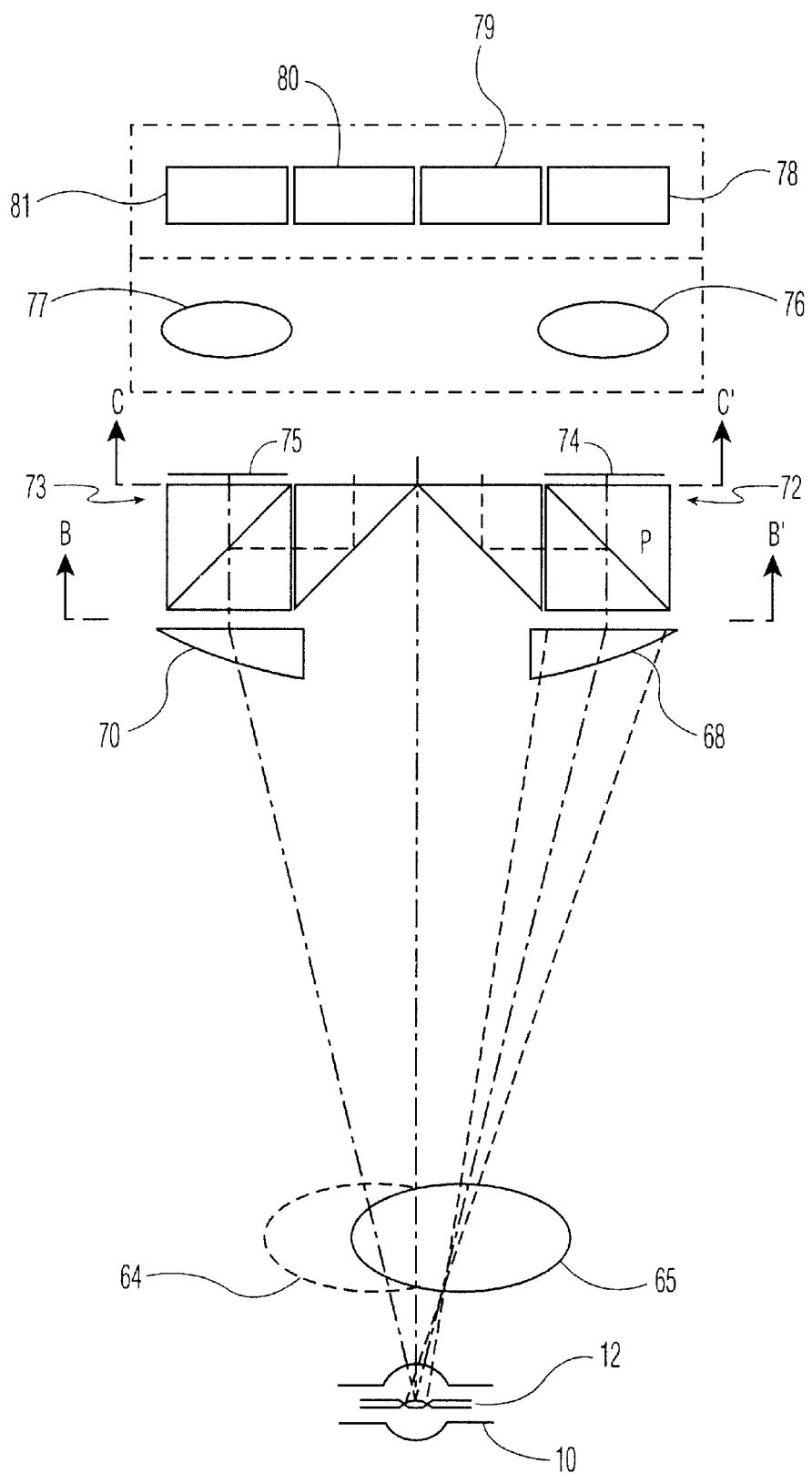

A variation of the two-path embodiment of FIG. 2 is illustrated in FIGS. 3A and 3B, in which condenser lenses 64 and 65 are offset both axially and laterally from the central axis C. Plane mirrors 66 and 67 are positioned transverse to the axial plane and parallel to the lateral plane to reflect the axially diverging rays from the condenser lenses 64 and 65 back toward central axis C and to field lenses 68 and 70, which in turn direct the rays into PCD's 72 and 73, and thence to half wave plates 74 and 75, which are similar in structure and operation to the PCD's 44 and 50 and half wave plates 55 and 57 shown in FIG. 2.

Section views B–B' and C–C' show projected views of the light distribution before and after splitting by the PCD's, respectively. The elongated arc images 76 and 77 in section B–B' have been converted into rectangular shaped images 78–81 in section C–C' by virtue of the integrating property of the prism TIR interfaces which create a rectangular light guide. A mirror, retro-reflecting light backward onto the arc, is not shown in the figure.

Figure 4:
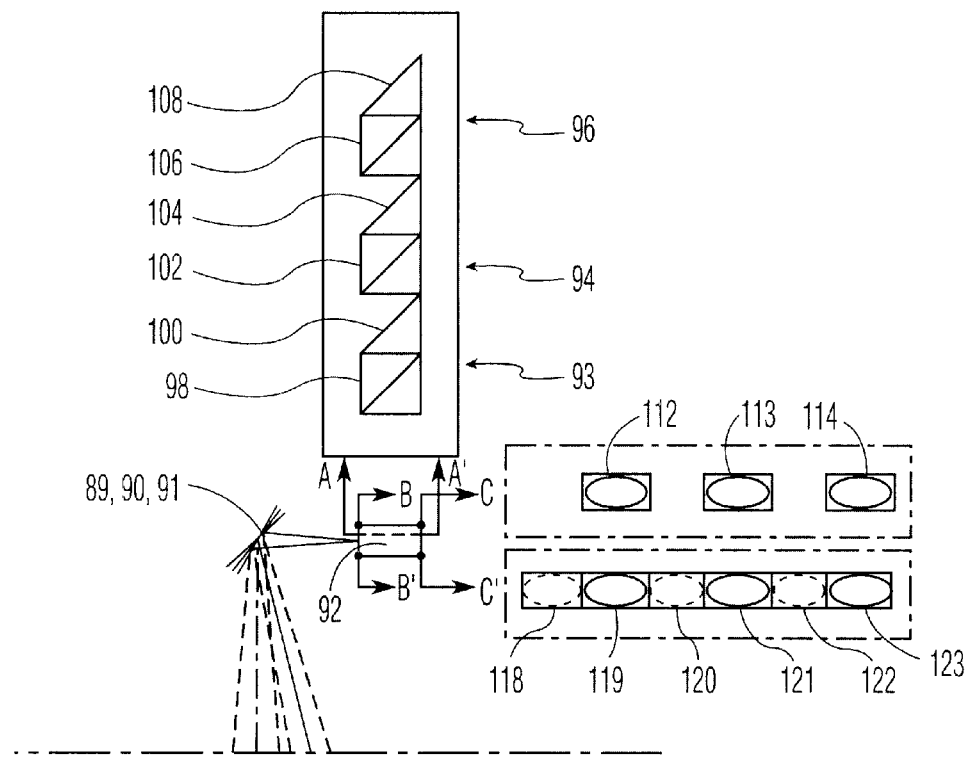
FIG. 4 is an axial view of a three-lens arc lamp illuminator of the invention, showing projected views of the light distribution in different planes.
Figure 4:
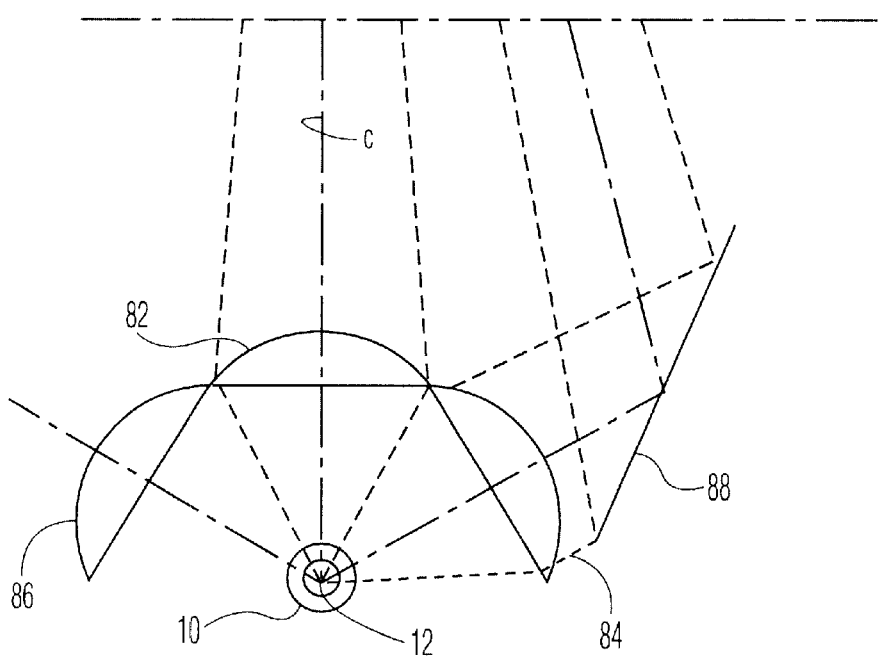

FIG. 4 illustrates another embodiment of the invention, in which three condenser lenses, a central lens 82 and laterally offset side lenses 84 and 86 divide the arc lamp light into three optic paths, the central path along the central axis C, and the side paths diverging axially from the central path. Large plane mirrors, one of which, 88, is shown, reflect the side path rays back toward the central axis to mirrors 89 through 91, spaced just enough to direct the rays from these multiple paths into an array of PCD's 92, which split the arc images in the manner previously described. As shown in section view A–A', array 92 is composed of three PCD's 93, 94 and 96, similar in construction and operation to PCD's 44 and 50, previously described.

PCD's 93, 94 and 96 are each composed of a compound prism (98, 102, 106) and another prism (100, 104, 108).

As in FIG. 3B, section views B–B' and C–C' in FIG. 4 show projected views of the arc images before and after splitting by the PCD's. Just as in the embodiment of FIG. 3, the arc images 112 through 114 are confined to a rectangular shape by prism boundaries prior to splitting into arc images 118 through 123.

The 3 mirrors are slightly offset from one another in the axial direction in order to bring each off-axis beam back to a common axis.

Figure 5A:
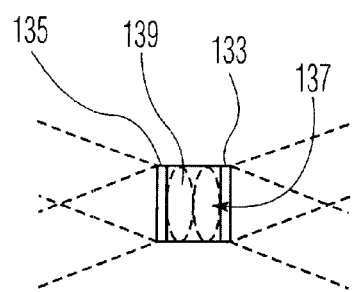
FIG. 5 is an axial view of a compact light collection arrangement including a compound light guide for a two-lens arc lamp illuminator of the invention.
Figure 5B:
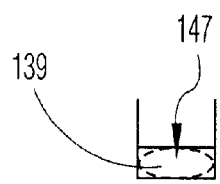
Figure 5:
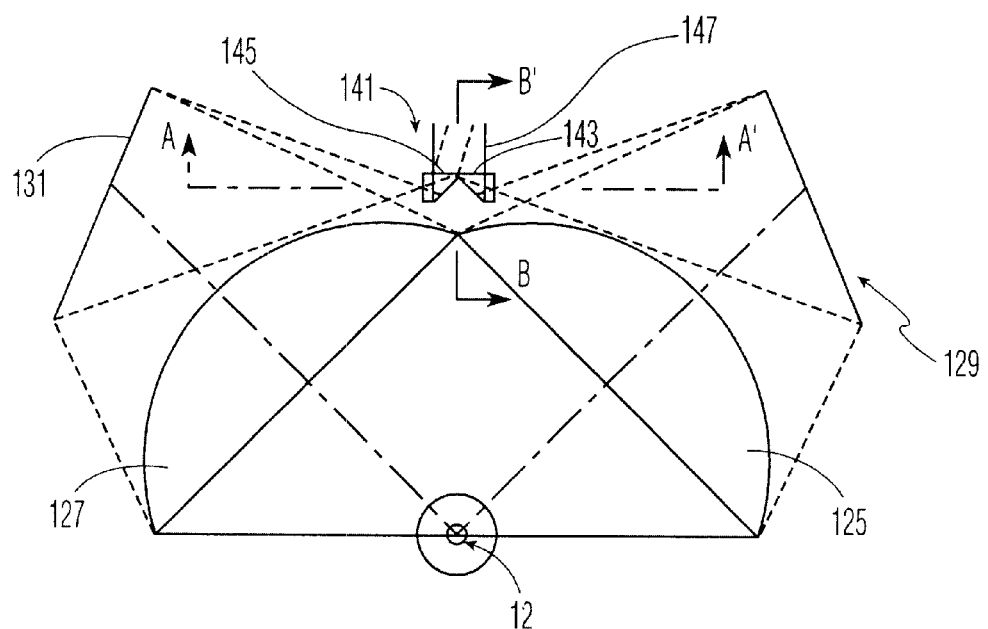

FIG. 5 illustrates a compact arrangement for the formation of a pair of arc images, which images may then be split using a polarization conversion system in the manner already described. Lenses 125 and 127 form separate images 137 and 139 of the arc 12 and folding mirrors 129 and 131 direct these images into opposing input ports 133 and 135 of compound light guide 141. The input aperture dimensions of the input ports 133 and 135 are matched to the arc image size, as illustrated in view B–B'. Light beams from the two ports 133 and 135 are folded into parallel paths by TIR prisms 143 and 145 and carried further by the single rectangular light guide 147 to a polarization conversion system (not shown).

Figure 6:
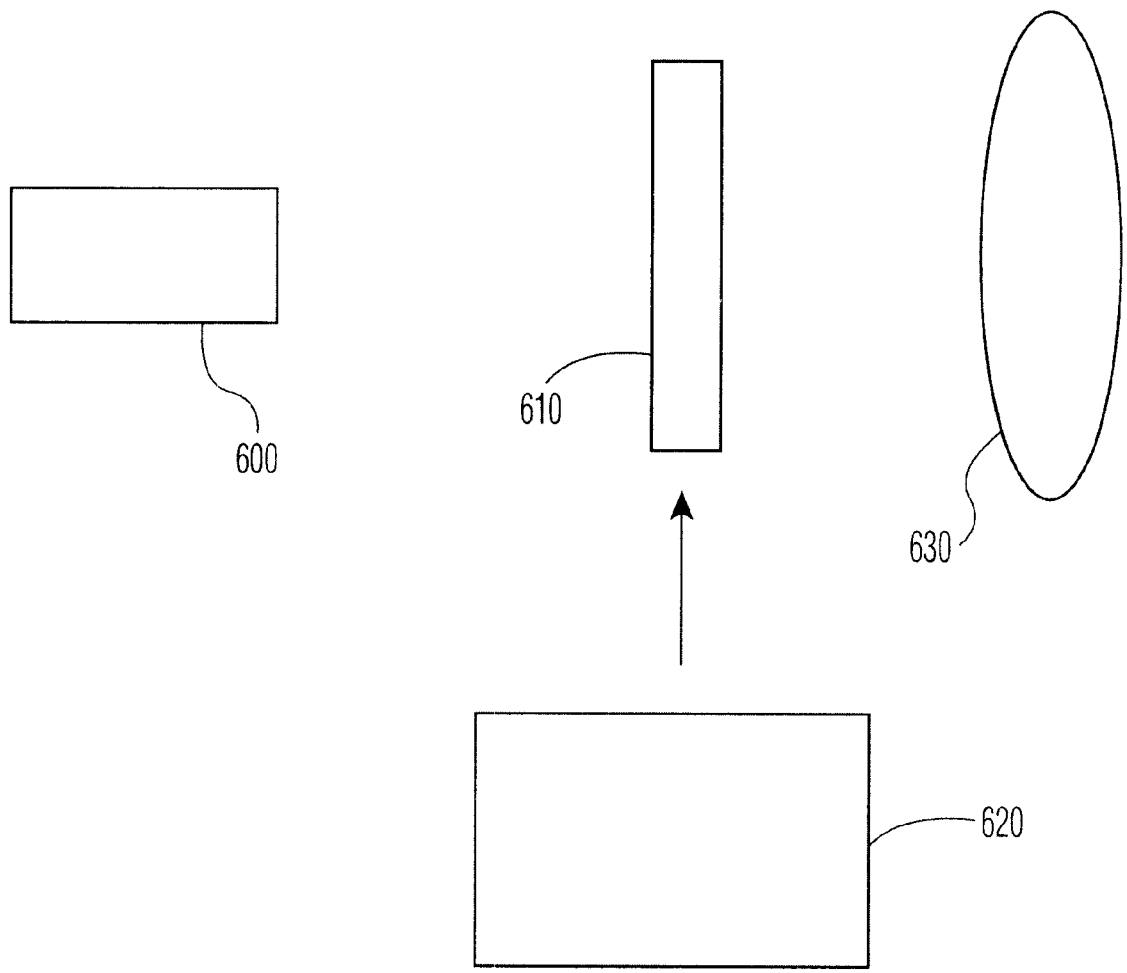
FIG. 6 is a block diagram of a projection system incorporating an arc lamp illuminator of the invention.

FIG. 6 is a block diagram of a projection system incorporating an arc lamp illuminator of the invention. Illuminator 600 provides illumination to light modulator panel 610, which modulates the light in accordance with display information from electrical signal input source 620. Projection lens 630 projects the modulated light onto a display surface, not shown. While the illuminator of the invention is useful in any projection display system, it is particularly useful in projection systems requiring stripe-shaped illumination, such as the single panel scrolling color projection system. Such a system is described, for example, in U.S. Pat. No. 5,410,370, "Single panel color projection video display improved scanning" issued to P. Janssen on Mar. 25, 1994, and U.S. Pat. No. 5,416,514, "Single panel color projection video display having control circuitry for synchronizing the color illumination system with reading/writing of the light valve" issued to P. Janssen et al. on May 16, 1995, the disclosures of which is hereby incorporated by reference into this description.

The invention has necessarily been described in terms of a limited number of embodiments. From this description, other embodiments and variations of embodiments will become apparent to those skilled in the art, and are intended to be fully encompassed within the scope of the invention and the appended claims.

What is claimed is:

1. An arc lamp illuminator for a projection system comprising:
   an arc lamp comprising an envelope enclosing an elongated arc having an axis lying in a lateral plane;
   at least one projection lens for projecting an image of the arc onto an image plane, the image plane oriented parallel to the arc image axis;
   at least one polarization conversion system comprising at least two compound prisms, each compound prism including an internal directional polarizer for splitting the projected arc image into primary and secondary arc images split laterally along the axis in the image plane to result in an elongated illumination beam which is elongated along the arc axis for a distance greater than the length of the original arc image, and for converting the primary and secondary arc images into polarized arc images having first and second polarization senses, respectively; and
   a rotator device for converting the polarization sense of either the primary or secondary arc image to correspond to the polarization sense of the other arc image.

2. The arc lamp illuminator of claim 1 comprising:
   first and second projection lenses for projecting the arc image along first and second paths;
   for each path; a polarization conversion system; a field lens for directing the projected arc image into the polarization conversion system; and a plane mirror for directing the projected arc image to the field lens.

3. The arc lamp illuminator of claim 2 in which the first and second projection lenses project the arc images along first and second paths in the lateral plane, and the plane mirrors for the first and second paths are normal to the lateral plane to reflect the projected images from the first and second projection lenses, respectively.

4. The arc lamp illuminator of claim 2 in which the first and second projection lenses project the arc images along first and second paths above and below the lateral plane, and the plane mirrors for the first and second paths are parallel to and lie above and below the lateral plane, respectively, to reflect the projected images from the first and second projection lenses, respectively.

5. The arc lamp illuminator of claim 1 comprising:
   first, second and third projection lenses for projecting the arc image along first, second and third paths;
   for each path; a polarization conversion system; a small mirror for directing the projected arc image into the polarization conversion system; and for the first and third paths, a large mirror for directing the projected arc image to the small mirror.

6. The arc lamp illuminator of claim 1 in which the rotator device is a half wave plate.

7. The arc lamp illuminator of claim 1 which includes:
   first and second projection lenses for projecting the arc image along diverging first and second paths;
   first and second mirrors for directing the projected arc images along converging paths;
   a compound light guide positioned to intercept the converging arc images, the compound light guide comprising a pair of opposing input ports for inputting the arc images, a pair of TIR prisms for directing the arc images along a common path, and a rectangular light guide for guiding the arc images to the polarization conversion system.

8. A projection system comprising:
   a light modulator panel for modulating a light image in accordance with an electrical signal;
   a lens for projecting the modulated image onto a display screen; and
   an arc lamp illuminator for illuminating the light modulator panel, the illuminator comprising:
     an arc lamp comprising an envelope enclosing an elongated arc having an axis lying in a lateral plane;
     at least one projection lens for projecting an image of the arc onto an image plane, the image plane oriented parallel to the arc image axis;
     at least one polarization conversion system comprising at east two compound prisms, each compound prism including an internal directional polarizer for splitting the projected arc image into primary and secondary arc images split laterally along the axis in the image plane to result in an elongated illumination beam which is elongated along the arc axis for a distance greater than the length of the original arc image, and for converting the primary and secondary arc images into polarized arc images having first and second polarization senses, respectively; and
     a rotator device for converting the polarization sense of either the primary or secondary polarized arc image to correspond to the polarization sense of the other polarized arc image.

* * * * *